Figure 1:
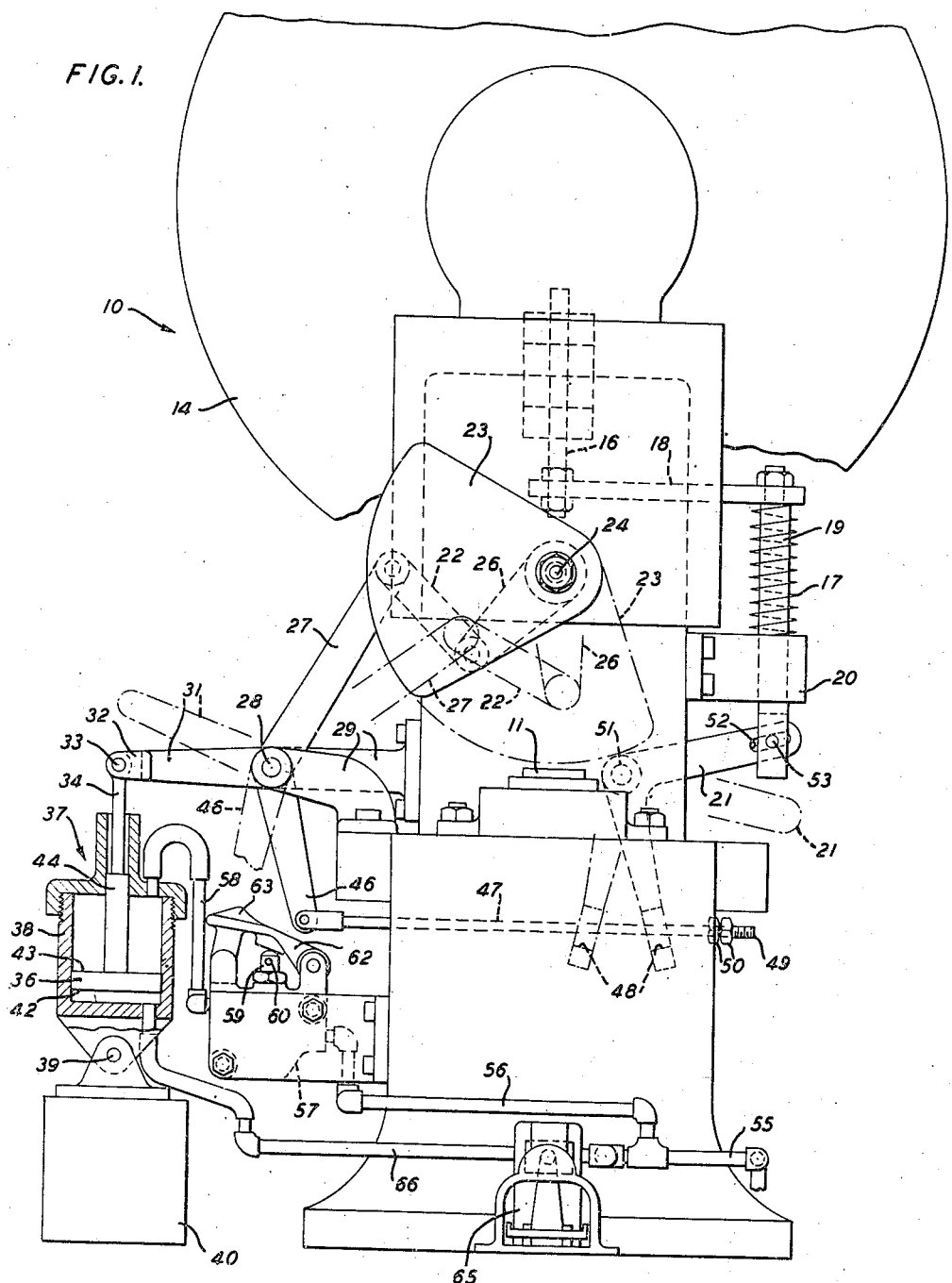

Oct. 4, 1949.  A. A. WILLIAMS  2,483,955
FLUID OPERATED GUARD AND CLUTCH CONTROL
Filed Sept. 19, 1946  2 Sheets-Sheet 1

INVENTOR
A.A.WILLIAMS
BY
*W.C.Parnell*
ATTORNEY

Oct. 4, 1949.     A. A. WILLIAMS     2,483,955
FLUID OPERATED GUARD AND CLUTCH CONTROL
Filed Sept. 19, 1946                    2 Sheets-Sheet 2

INVENTOR
A. A. WILLIAMS
BY
ATTORNEY

Patented Oct. 4, 1949

2,483,955

UNITED STATES PATENT OFFICE 2,483,955

FLUID OPERATED GUARD AND CLUTCH CONTROL

Alfred A. Williams, Westfield, N. J., assignor to Western Electric Company, Incorporated, New York, N. Y., a corporation of New York Application September 19, 1946, Serial No. 697,861

5 Claims. (Cl. 192—134)

This invention relates to control mechanisms for machines, and more particularly to air operated controls for machines having guards and operating clutches.

Material working machines, having relatively movable tools between which work is fed by an operator, usually employ guards to cover the working zones of such machines during each operating cycle to assure against injury to the operator by the removal of the operator's hand from the working zone prior to the closing or interengagement of the material working tools of the machine. To accomplish this result, particularly in punch presses of the one revolution type under the control of clutches which must be released to begin each operating cycle, the guards in some instances have linked mechanically with the clutch releasing mechanism to assure operation of the guard over the working zone prior to the releasing of the clutch.

An object of the invention is to provide a relatively simple control mechanism for operating a guard and clutch of a material working machine in such a manner as to guard the working zone effectively between operations of the machine without causing unnecessary discomfort to the operator.

With this and other objects in view, the invention comprises a control mechanism for a material working machine including a material working member operable through single cycles upon actuation of a clutch and a guard movable from its normal position, away from the working zone, to its guarding position in front of the working zone, the control mechanism including a single fluid motor operable upon opening of a valve in a fluid line to move the guard under a low pressure toward its guarding position in front of the working zone and as the guard nears the completion of its movement in front of the working zone, means is actuated to apply high pressure to the motor to operate the clutch. The motor includes a single cylinder with a piston having opposing surfaces of varying effective sizes whereby the admission of a fluid under like pressures to the cylinder at opposing sides of the piston will cause the piston to move under a low pressure, namely the existing difference between the effective pressures at the opposing sides of the piston. A mechanism connecting the guard and the piston will thus move the guard under a low pressure making it possible for an object such as the operator's hand positioned in the path of the guard to stop the guard against the existing force of the motor. While the guard is interrupted in its movement toward its guarding position, the mechanism linking the motor with the clutch will remain ineffective and the clutch will not be operated until this disturbance is removed. An exhausting valve is positioned in the line extending to the smaller side of the piston and the mechanism connecting the guard to the operating means for the clutch is effective to operate the exhausting valve at a given point in the travel of the guard near the end of its stroke. Opening of the exhausting valve will close the fluid line from the supply leading to the small side of the piston and exhaust the fluid in that side of the piston allowing the full force of the fluid under pressure at the large side of the piston to operate the motor and, through the connecting mechanism, operate the clutch.

Figure 2:
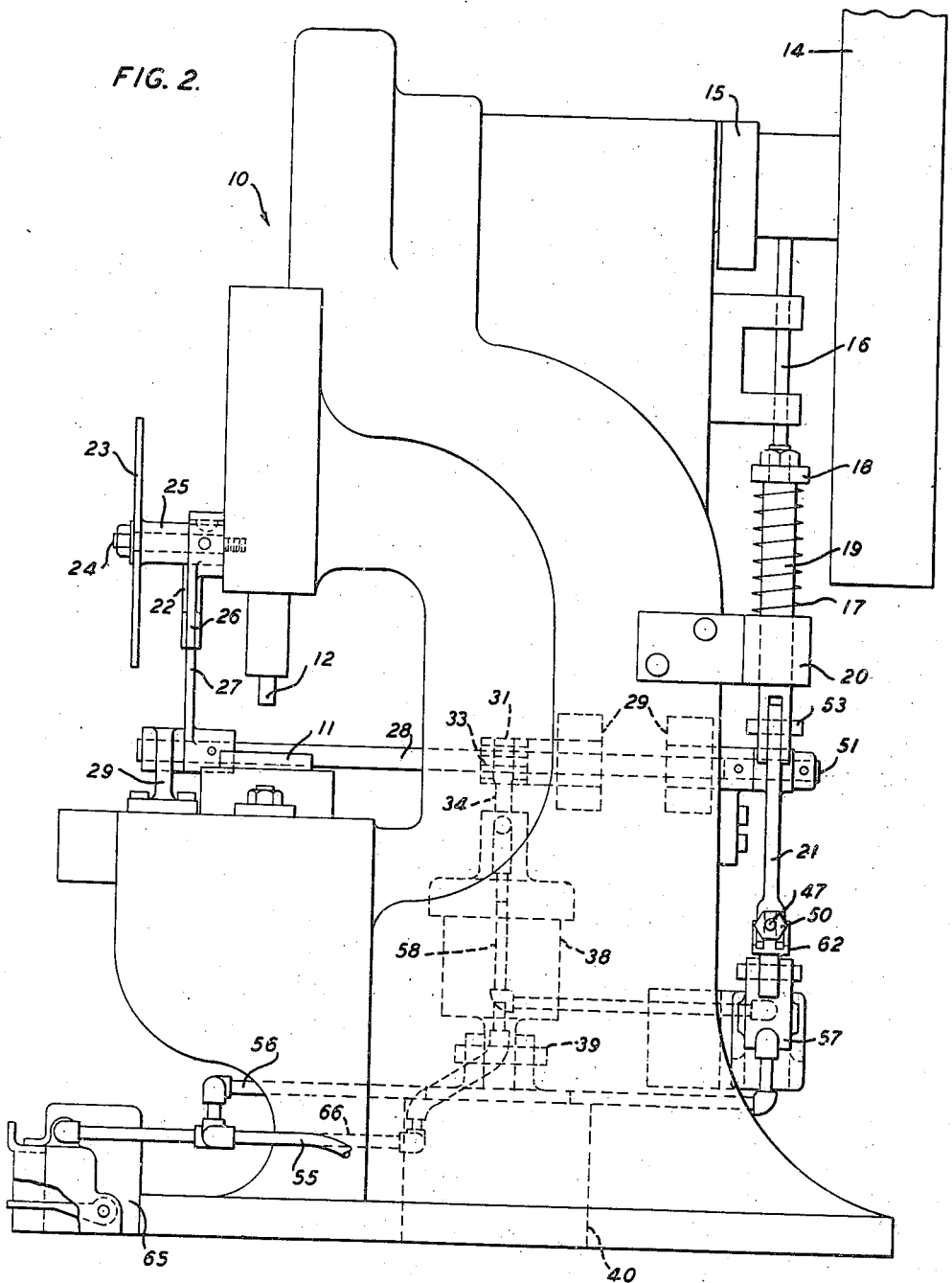

Other objects and advantages will be apparent from the following detailed description when considered in conjunction with the accompanying drawings, wherein Fig. 1 is a front elevational view of a material working machine embodying the invention; and Fig. 2 is a side elevational view of the structure shown in Fig. 1.

The machine selected to illustrate the invention is a punch press 10 having a stationary material working member or die 11 and a movable material working element or punch 12. The punch 12 is operated in the conventional manner through a continuously rotating driving means including a fly wheel 14 connected to its crank shaft (not shown) through a clutch 15 of the one revolution type operated by a pull rod 16. A spring 17 normally acting on the pull rod 16 urges the rod upwardly to maintain disconnection of the clutch, the clutch being operated for a single revolution when the rod is moved downwardly. In the present illustration, an arm 18 connects the pull rod 16 to a companion pull rod 19 slidably mounted for vertical movement in a guide bracket 20 and notched at its lower end for connection with a lever 21. The spring 17 is disposed concentric with the companion pull rod 19 between the arm 18 and the bracket 20.

Leaving this mechanism for the present, attention is directed to a fan type guard 23 pivotally supported at 24 upon the face of the machine and movable from its normal out-of-the-way position shown in solid lines in Fig. 1 to its guarding position shown in dot-dash lines in front of the working zone of the machine. The inner hub 25 of the guard has a lever 26 keyed thereto, the outer end of the lever being connected to another lever 27 by a link 22. The lever 27 is fixedly mounted upon a shaft 28 which is journalled in suitable bearings 29 and extends rearwardly of the machine as illustrated in Fig. 2. Another lever 31 is fixedly mounted upon the shaft 28 and has a forked end 32 pivotally connected at 33 to a rod 34 of a piston 36. The piston 36 is a part of a fluid or air motor 37, the cylinder 38 of which is pivotally supported at 39 upon a suitable base 40. The lower surface 42 of the piston is equal to the full cross-sectional area of the piston area, the effective upper surface 43 being reduced by a member 44 connecting the rod 34 to the piston. The size of the member 44 may vary depending upon the variations in the pressures desired, first for operating the guard 23 and second for operating the clutch 15.

The shaft 28 is connected to the clutch operating mechanism by a lever 46 mounted on the shaft 28 and pivotally connected at its free end to a rod 47 which extends through an elongate aperture 48 in one arm of the lever 21. The rearmost end of the rod 47 is threaded at 49 to receive nuts 50 disposed at selected positions on the rod to engage the lower arm of the lever 21 at a selected time during the operation of the guard 23. The lever 21 is pivotally mounted at 51, the upper arm thereof having an elongate aperture 52 to receive a pin 53 of the companion pull rod 19 completing the connection between the pull rod 19 and the lever 21.

The motor 37 in the present embodiment is operated by air under a given pressure from a supply line 55. A line 56 extending from the supply line 55, supplies the air under pressure to the top of the cylinder 38 through an exhaust valve 57 and a line 58. The normal condition of the exhaust valve is to allow free passage of air from line 56 through line 58. A spring operated plunger 59, which is hollow for a portion of its length to an exhaust port 60, maintains the lines 56 and 58 connected until depressed by a cam-like lever 62 at which time line 56 is closed and line 58 is open to the atmosphere through the exhaust port 60. The cam lever 62 with its high portion 63 is positioned adjacent the lever 46 whereby the lever 46 may actuate the lever 62 when engaging the portion 63 to close the line 56 as the guard 23 nears its guarding position. A foot operated valve 65 connects the supply line 55 to a line 66 which leads to the bottom of the cylinder 38.

Prior to the operation of the machine, the guard 23 is in the out-of-the-way position permitting the operator to feed material between the die 11 and the punch 12. The guard is held in its normal position by fluid from the supply line 55 passing through the line 56, valve 57 and line 58 to the top of the cylinder, there being at this time no pressure beneath the piston. To operate the machine, the operator depresses the valve 65 connecting line 66 to the supply line 55 and directing the air under pressure beneath the piston 36. The effective pressure beneath the piston, being equal to the difference between the two pressures above and below the piston, will cause upward movement of the piston to rock the lever 31 clockwise, rocking the shaft 28 and with it the levers 27 and 46. The position of the nuts 50 on the rod 47 allows operation of the guard to a position in front of the working zone where it will move the operator's hand out of danger of the material working elements before the clutch operating mechanism will function. At that time the lever 46 has moved into engagement with the high portion of the lever 62 to move the plunger 59 downwardly a distance sufficient to close the fluid line 56 and open the line 58 to exhaust. At this time the pressure above the piston is removed and the air at the top of the cylinder is exhausted bringing into effect the full pressure beneath the piston to operate the lever 21 to pull the rod 19 against the force of the spring 17, and to operate the clutch for one cycle of operation of the machine.

When the operating cycle has been completed, the operator's foot having released the valve 55 to close connection between the supply line 55 and the line 66, the air beneath the piston 36 may be exhausted through the valve 65. The force of the spring 17 will move the pull rods 16 and 19 upwardly and rock the lever 21 counterclockwise to move the rod 47 to the left a sufficient distance to move the lever 46 free of the high portion 63 of the valve lever 62. As soon as this takes place, the valve 57 resumes its normal condition, closing the exhaust 60 and opening connection between the fluid lines 56 and 58. The motor 38 then functions, it being operated by the fluid or air under pressure above the piston to actuate the mechanism linking it with the guard, to move the guard into its normal position. The control mechanism is again in readiness for another cycle of operation of the machine. The material of course is to be fed to the die 11 before the valve 65 is actuated to again start operation of the motor under a low pressure which in effect is the result of the full pressure from the supply at the bottom of the cylinder lessened by the opposing force of the fluid or air under pressure at the top of the cylinder.

Although specific improvements of the invention have been shown and described, it will be understood that they are but illustrative and that various modifications may be made therein without departing from the scope and spirit of this invention as defined by the appended claims.

What is claimed is:

1. A control mechanism for a machine having a material working tool mounted for movement through an operating cycle into and out of a working position, clutch controlled power means to move the tool through the operating cycle, a guard supported by the machine and movable to shield the working area of the machine, the control mechanism comprising a motor operable by fluid under pressure, a main mechanism connecting the motor and the guard to cause actuation of the guard upon operation of the motor, an additional mechanism linked with the main mechanism and actuated thereby to operate the clutch for one cycle of operation of the machine when the guard nears its shielding position, means to cause operation of the motor by fluid under pressure to apply a low force to the main mechanism during actuation of the guard toward its shielding position, and additional means actuable to cause the motor to apply a higher force to the mechanisms during actuation of the clutch.

2. A control mechanism for a machine having a material working tool mounted for movement through an operating cycle into and out of a working position, clutch controlled power means to move the tool through the operating cycle, a guard supported by the machine and movable to shield the working area of the machine, the control mechanism comprising a motor operable by fluid under pressure, a main mechanism connecting the motor and the guard to cause actuation of the guard upon operation of the motor, an additional mechanism linked with the main mechanism and actuated thereby to operate the clutch for one cycle of operation of the machine when the guard nears its shielding position, means to direct a fluid under a given pressure to the motor for operation of the motor to apply a given operating force to the said mechanisms to actuate them in their respective order, means to direct a fluid under pressure to the motor to oppose the effective force of the first fluid under pressure to decrease its effect on the operation of the main mechanism to a given low operating force during the major portion of the movement of the guard, and means to cut off the second fluid under pressure to remove the opposing pressure to the motor prior to the actuation of the clutch.

3. A control mechanism for a machine having a material working tool mounted for movement through an operating cycle into and out of a working position, clutch controlled power means to move the tool through the operating cycle, a guard supported by the machine and movable to shield the working area of the machine, the control mechanism comprising a motor operable by fluid under pressure, a main mechanism connecting the motor and the guard to cause actuation of the guard upon operation of the motor, an additional mechanism linked with the main mechanism and actuated thereby to operate the clutch for one cycle of operation of the machine when the guard nears its shielding position, means to direct a fluid under a given pressure to the motor for operation of the motor to apply a given operating force to said mechanisms to actuate them in their respective order, means to direct a fluid under pressure to the motor to oppose the effective force of the first fluid under pressure to decrease its effect on the operation of the main mechanism to a given low operating force during the major portion of the movement of the guard, and means under the control of one of the mechanisms to cut off the second fluid under pressure to the motor to remove the opposing fluid pressure to the mechanisms prior to the actuation of the clutch.

4. A control mechanism for a machine having a material working tool mounted for movement through an operating cycle into and out of a working position, clutch controlled power means to move the tool through the operating cycle, and a guard supported by the machine and movable to shield the working area of the machine, the control mechanism comprising a fluid motor including a fixed position cylinder, a piston with opposing surfaces movable in the cylinder and a member connected to one of the surfaces of the piston to reduce the effective area thereof, a main mechanism connecting the member of the motor to the guard to cause actuation of the guard upon operation of the motor, an additional mechanism linked with the main mechanism and actuated thereby to operate the clutch for one cycle of operation of the machine when the guard nears its shielding position, means to direct fluids under like pressures to the opposing surfaces of the piston in the cylinder whereby the piston with the member will be moved under a low operating force to cause the main mechanism to move the guard into its shielding position, and means actuated by the main mechanism at that time to cut off the fluid under pressure to one surface of the piston whereby the full force of the fluid under pressure against the opposing surface of the piston may move it with the mechanisms to cause actuation of the clutch.

5. A control mechanism for a machine having a material working tool mounted for movement through an operating cycle into and out of a working position, clutch controlled power means to move the tool through the operating cycle, and a guard supported by the machine and movable to shield the working area of the machine, the control mechanism comprising a fluid motor including a fixed position cylinder, a piston with opposing surfaces movable in the cylinder and a member connected to one of the surfaces of the piston to reduce the effective area thereof, a main mechanism connecting the member of the motor to the guard to cause actuation of the guard upon operation of the motor, an additional mechanism linked with the main mechanism and actuated thereby to operate the clutch for one cycle of operation of the machine when the guard nears its shielding position, means to direct fluids under like pressures to the opposing surfaces of the piston in the cylinder whereby the piston with the member will be moved under a low operating force to cause the main mechanism to move the guard into its shielding position, a normally open valve controlling the fluid under pressure to one surface of the piston, and cam means actuable by the main mechanism when the guard is in the shielding position to close the valve to cut off the fluid under pressure to one surface of the piston whereby the full force of the fluid under pressure against the opposing surface of the piston may move it with the mechanisms to cause actuation of the clutch.

ALFRED A. WILLIAMS.

REFERENCES CITED

The following references are of record in the file of this patent:

UNITED STATES PATENTS

| Number | Name | Date |
|---|---|---|
| 1,990,052 | Sosa | Feb. 5, 1935 |
| 2,339,214 | Yanchenko | Jan. 11, 1944 |
| 2,429,261 | Ewaldson | Oct. 21, 1947 |

FOREIGN PATENTS

| Number | Country | Date |
|---|---|---|
| 290,683 | Italy | Nov. 26, 1931 |
| 617,330 | France | Feb. 17, 1927 |